(12) United States Patent
Sandberg et al.

(10) Patent No.: US 8,102,909 B2
(45) Date of Patent: Jan. 24, 2012

(54) SYSTEMS AND METHODS THAT PROVIDE FREQUENCY DOMAIN SUPPLEMENTAL TRAINING OF THE TIME DOMAIN EQUALIZER FOR DMT

(75) Inventors: Stuart D. Sandberg, Arlington, MA (US); Arnon Friedmann, Marlboro, MA (US); Jelena Jovin, Somerville, MA (US); Bindu Chandna, Burlington, MA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 12/783,783

(22) Filed: May 20, 2010

(65) Prior Publication Data

US 2010/0290514 A1 Nov. 18, 2010

Related U.S. Application Data

(63) Continuation of application No. 12/615,077, filed on Nov. 9, 2009, which is a continuation of application No. 12/013,874, filed on Jan. 14, 2008, now Pat. No. 7,636,389, which is a continuation of application No. 11/616,630, filed on Dec. 27, 2006, now abandoned, which is a continuation of application No. 09/982,065, filed on Oct. 19, 2001, now Pat. No. 7,180,938.

(60) Provisional application No. 60/241,664, filed on Oct. 19, 2000.

(51) Int. Cl.
*H03H 7/30* (2006.01)

(52) U.S. Cl. ..................................... 375/232

(58) Field of Classification Search ........... 375/229–236
See application file for complete search history.

(56) References Cited

U.S. PATENT DOCUMENTS

| | | | |
|---|---|---|---|
| 6,307,889 B1 | 10/2001 | Chun | |
| 6,459,678 B1 | 10/2002 | Herzberg | |
| 6,512,789 B1 * | 1/2003 | Mirfakhraei | 375/229 |
| 6,628,704 B1 * | 9/2003 | Long et al. | 375/219 |
| 6,735,244 B1 * | 5/2004 | Hasegawa et al. | 375/219 |
| 6,778,599 B1 | 8/2004 | Doron | |
| 6,870,888 B1 | 3/2005 | Shapiro et al. | |
| 7,180,938 B2 | 2/2007 | Sandberg et al. | |
| 7,636,389 B2 | 12/2009 | Sandberg et al. | |
| 2007/0104262 A1 | 5/2007 | Sandberg et al. | |
| 2010/0054321 A1 | 3/2010 | Sandberg et al. | |

OTHER PUBLICATIONS

"G. Vdsl: Training of FMT transceivers," ITU—Telecommunication Standardization Sector, Study Group 15, 'Online! Jan. 31-Feb. 4, 2000, pp. 1-5.
Al-Dhahir et al., "Optimum Finite-length Equalization for Multicarrier Transceivers," IEEE Transactions on Communications, Jan. 1996, vol. 44, No. 1, pp. 56-64.

(Continued)

*Primary Examiner* — Kevin Kim
(74) *Attorney, Agent, or Firm* — Jason H. Vick; Sheridan Ross PC

(57) ABSTRACT

Using a known or later developed time domain equalizer coefficient training algorithm, a least square solution for the time domain equalizer coefficients is taken at a starting point and iteratively improved on. In particular, the improvement is directed towards maximizing number of bits per frame loaded over the time domain equalizer coefficient choice. This can be accomplished by maximizing capacity directly rather than setting a goal to shorten the channel and hoping that the capacity will be maximized as a result.

4 Claims, 3 Drawing Sheets

OTHER PUBLICATIONS

Sandberg et al., "Overlapped Discrete Multitone Modulation for High Speed Copper Wire Communications," IEEE JSAC, Dec. 1995, vol. 13, No. 9, pp. 1571-1585.
International Search Report for International (PCT) Patent Application No. PCT/US01/32503, mailed Oct. 9, 2002.
U.S. Appl. No. 12/783,788, filed May 20, 2010, Sandberg et al.
Official Action for U.S. Appl. No. 09/982,065, mailed Jun. 14, 2005.
Official Action for U.S. Appl. No. 09/982,065, mailed Mar. 8, 2006.
Notice of Allowability for U.S. Appl. No. 09/982,065, mailed Nov. 21, 2006.
Official Action for U.S. Appl. No. 11/616,630, mailed Jul. 23, 2007.
Official Action for U.S. Appl. No. 12/013,874, mailed Jul. 16, 2009.
Official Action for U.S. Appl. No. 12/013,874, mailed Oct. 30, 2008.
Notice of Allowability for U.S. Appl. No. 12/013,874, mailed Oct. 2, 2009.
Official Action for U.S. Appl. No. 12/615,077, mailed Aug. 12, 2010.

* cited by examiner

US 8,102,909 B2

SYSTEMS AND METHODS THAT PROVIDE FREQUENCY DOMAIN SUPPLEMENTAL TRAINING OF THE TIME DOMAIN EQUALIZER FOR DMT

RELATED APPLICATION DATA

This application is a Continuation of U.S. application Ser. No. 12/615,077 filed Nov. 9, 2009, which is a Continuation of U.S. application Ser. No. 12/013,874, filed Jan. 14, 2008, now U.S. Pat. No. 7,636,389, which is a Continuation of U.S. application Ser. No. 11/616,630, filed Dec. 27, 2006 now abandoned, which is a Continuation of U.S. application Ser. No. 09/982,065, filed Oct. 19, 2001, now U.S. Pat. No. 7,180,938 which claims benefit of and priority to U.S. Application Ser. No. 60/241,664 filed Oct. 19, 2000, entitled "Frequency Domain Supplemental Training of the Time Domain Equalizer for DMT," each of which are incorporated herein by reference in their entirety.

BACKGROUND OF THE INVENTION

1. Field of the Invention

In general, the systems and methods of this invention relate to time domain equalizer training. In particular, this invention relates to systems and methods for supplemental frequency domain training of the time domain equalizer in a discrete multi-tone system.

2. Description of Related Art

In Discrete Multi-tone Modulation (DMT) systems, the time domain equalizer (TDQ) is a finite impulse response (FIR) filter located at the receiver side of a DSL modem. The TDQ is used to reduce the intersymbol interference (ISI). If the channel is shortened in time to have a length no greater than the length of the cyclic prefix, the intersymbol interference can be eliminated. Thus, a common method for training the TDQ in a DMT system is to jointly optimize the numerator and denominator of the autoregressive (AR) model for the channel where the order of the numerator is equal to the cyclic prefix length and the denominator is used as the TDQ setting. The training is based on transmission and reception of a known reference signal, such as the reverb signal in ADSL systems, using a least squares fit of the AR channel model.

SUMMARY OF THE INVENTION

The supplemental training according to the exemplary systems and methods of this invention starts with the least squares solution of the time domain equalizer coefficients outlined above as its starting point, and iteratively improves on it.

Specifically, the medley-based supplemental training which is the subject of this application takes as input the output of a reverb-based TDQ training algorithm. Examples of reverb-based training algorithms are described in Stuart Sandberg and Michael Tzannes, "Overlapped Discrete Multitone Modulation for High Speed Copper Wire Communications," IEEE JSAC, vol 13, no. 9, December 1995, pg 1571-1585, incorporated herein by reference in its entirety, and include channel shortening schemes based on an AR fit to the transmission channel.

The improvement is geared towards maximizing the number of bits per frame loaded over the TDQ choice. In particular, capacity is maximized directly rather than setting a goal to shorten the channel and hoping that the capacity would be maximized as a result. The supplemental training operates in medley transmission mode, and requires a number of pseudorandom data frames.

Medley operation is selected in that the reverb data transmission, which is the repetitive transmission of the same reference frame, would not produce ISI in the received signal, and the SINR (Signal-to-Interference and Noise) determined in this way would not take into account the very component of error that the TDQ is intended to reduce. From the medley data, the SINR can be estimated over the bins used in the actual data transmission mode, and therefore, the number of bits per frame loaded.

The systems and methods of this invention use a directed search method on the capacity function to obtain an improved TDQ. The function in question is highly non-linear, and after linearization, e.g., using the first two terms in a Taylor series expansion around the starting TDQ point, a local extremum is sought. Since this does not guarantee the best solution, the same supplemental training can be repeated one or more times, each time starting with the TDQ solution resulting from the previous run.

In accordance with an exemplary embodiment of the invention, an aspect of the invention relates to performing frequency domain supplemental training of a time domain equalizer.

Additionally, aspects of the invention also relate to performing frequency domain supplemental training of a time domain equalizer in a discrete multi-tone environment.

Additional aspects of the invention also relate to performing the supplemental training numerous times, with each instance of the supplemental training using the last determined time domain equalizer coefficients to improve the quality of the results.

These and other features and advantages of this invention are described in, or are apparent from, the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
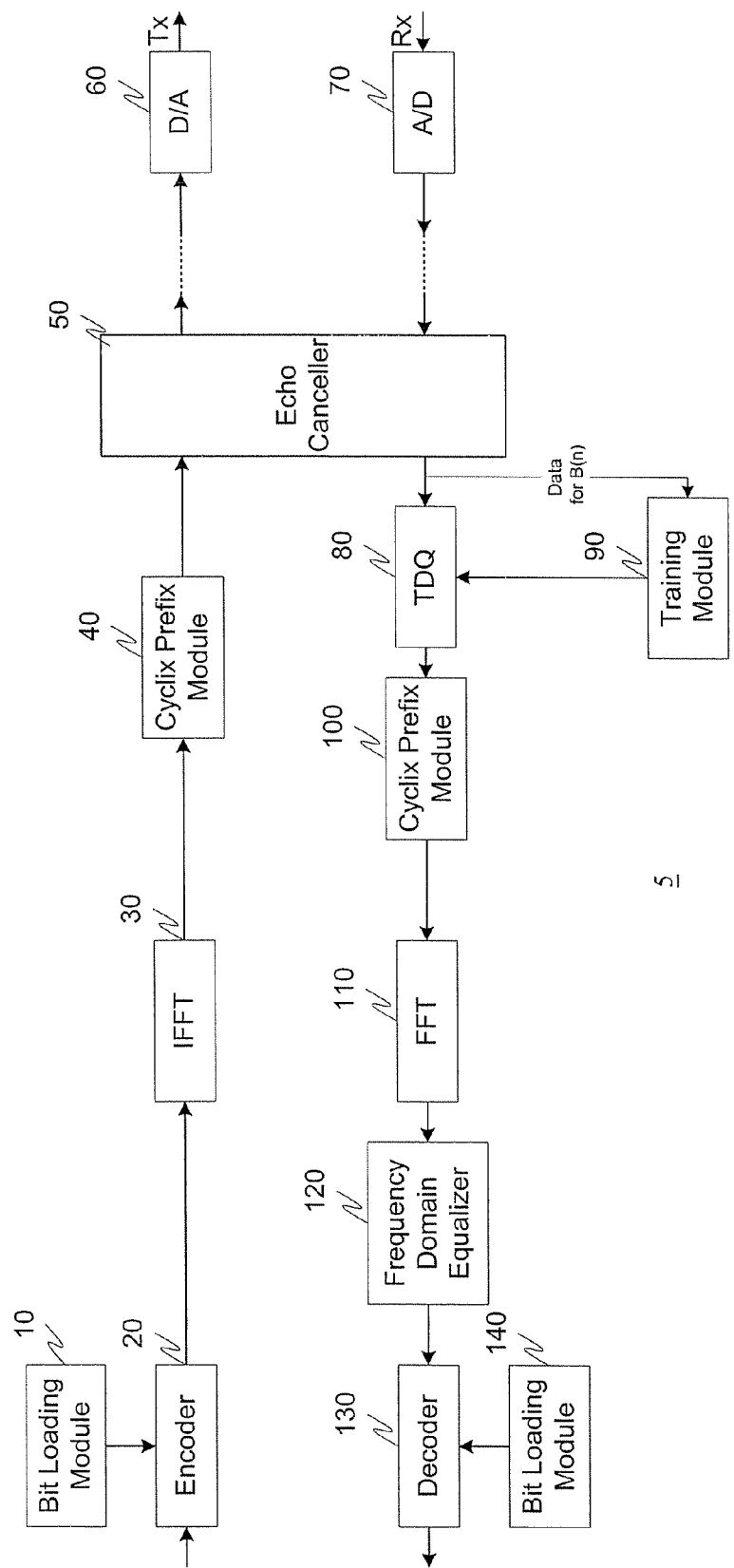
FIG. 1 is a functional block diagram illustrating a DMT DSL modem according to this invention.

The exemplary embodiments of this invention will be described in relation to the application and the invention to an ADSL transceiver environment. However, it should be appreciated that in general, the systems and methods of this invention will work equally well for any multi-carrier communication system including, but not limited to, DSL, VDSL, SDSL, HDSL, HDSL2, or any other discrete multi-tone, discrete wavelet multi-tone DSL or wireless OFDM system.

As discussed above, the supplemental training according to an exemplary embodiment of this invention commences with a Least Squares solution for the TDQ and improves on the accuracy. Specifically, the number of bits per frame loaded is maximized over the TDQ choice. The function to maximize is the sum of the number of bits that can be loaded in the bins that are used for transmission, and the maximization is over the TDQ setting:

$$\text{Max}_{(a)}(\text{SUM}_{(k)}(\log_{10}(\text{SINR}_k))),$$

where:
  a is the TDQ vector of size L×1,
  k is the bin index (out of N used bins, while N<M where M is the size of the receiver Fourier Transform), and
  $SINR_k$ is the signal to noise and interference ratio in bin k, expressed as a function of TDQ coefficients, a.

The above is the equivalent of minimizing the following:

$$\min_{(a)}(SUM_{(k)}(\ln E[|e_k|^2] - \ln E[|s_k|^2])),$$

where:
  $E[|e_k|^2]$ is the mean square error in bin k,
  $E[|s_k|^2]$ is the mean square signal in bin k, and
  $s_k = u_k H_k A_k a$,
  where:
    $u_k$ is the medley 4-QAM reference symbol in bin k,
    $H_k$ is an estimated (during reverb training) complex channel frequency response at bin k,
    $A_k$ is a Fourier basis row vector of length L, having frequency $2\pi k/M$, and $e_k = s_k - F_k B a$,
  where:
    $F_k$ is a Fourier basis row vector of length M, having frequency $2\pi k/M$,
    B is the received data matrix of size M×L, and each column of which is the received data frame (before the TDQ block), shifted by one sample as to represent the time passing operation. In the following, the dependence of B, $u_k$ and $s_k$ on frame will sometimes be shown explicitly as B(n), $u_k$(n), and $s_k$(n), where n is the frame index.

This function is highly nonlinear, and only the portion around the TDQ starting point is modeled by taking the first two terms of the Taylor series expansion. As a result, the function to minimize (over TDQ setting a) is:

$$SUM_{(k)}(w_k^e E[|e_k|^2] - w_k^s E[|s_k|^2]),$$

where the weights are:
  $w_k^e = 1/E[|e_{k,0}|^2]$,
  $w_k^s = 1/E[|s_{k,0}|^2]$, and
  $e_{k,0}$ and $s_{k,0}$ are $e_k$ and $s_k$, evaluated for the initial TDQ setting.

E[.] is evaluated as an average, over medley frames.

After some manipulation, the function to be optimized can be rewritten as:

$$\min_{(a)}(E[a'G_e a - a'G_s a]) = \min_{(a)}\{a'E[G_e]a - a'E[G_s]a\}$$

where:
  $G_e = G_{e\_mat} + W_e G_{e\_mat}$, is a matrix of size L×L, and where + is the conjugate transpose,
  $G_s = G_{s\_mat} + W_s G_{s\_mat}$, is a matrix of size L×L,
  $G_{s\_mat} = D_u D_H A$, is a matrix of size N×L,
  $D_u$=diagonal (u) and $D_H$=diagonal(H), are both matrices of size N×N,
  A is a Fourier basis matrix of size N×L, consisting of previously described vectors $A_k$,
  $G_{e\_mat} = G_{s\_mat} - FB$, is a matrix of size N×L,
  F is a Fourier basis matrix of size N×M, consisting of previously described vectors $F_k$,
  $W_e$=diagonal($w_k^e$), $W_s$=diagonal($w_k^s$), are both matrices of size N×N, and B is a received data matrix of size M×L, as discussed above.

The directed search for the minimum starts with the initial TDQ vector, $a_0$, and for each iteration the TDQ is updated:

$$a_i = \min \text{ eigenvector}\{E[G_e] - E[G_s]\}$$

where $E[G_e] - E[G_s]$ has been linearized/localized about $a_{i-1}$ as described above.

In practice, as discussed hereinafter, the iterations of the supplemental training are continued until arriving at a TDQ with satisfactory performance, or for some other predetermined number of iterations. Note that to obtain the TDQ for a new iteration, the TDQ from the previous iteration is used to estimate the signal, the error, and to obtain the updated matrix $E[G_e] - E[G_s]$.

FIG. 1 illustrates an exemplary DSL modem 5 according to this invention. In particular, the DSL modem 5 comprises a bit loading module 10, an encoder 20, an Inverse Fast Fourier Transform module 30, a cyclic prefix module 40, an echo canceller 50, a digital-to-analog converter 60, an analog-to-digital converter 70, a time domain equalizer 80, a training module 90, a cyclic prefix module 100, a Fast Fourier Transform module 110, a frequency domain equalizer 120, a decoder 130 and a bit loading module 140. As will be appreciated by one of ordinary skill in the art, various other components may be present in a DSL modem, however have been omitted for the sake of clarity.

While the exemplary embodiment illustrated in the FIG. 1 shows the modem 5 and various components collocated, it is to be appreciated that the various components of the modem can be combined or located at distant portions of a distributed network, such as a local area network, a wide area network, an intranet and/or the Internet, or within a modem. Thus, it should be appreciated, that the components of the modem 10 can be combined into one device or collocated on a particular node of a distributed network or combined into one or more of a CO or CPE modem. Thus, it will be appreciated from the following description, and for reasons of computational efficiency, that the components of the modem 10 can be arranged any location, such as in a general purpose computer or within a distributed network or dedicated modem without affecting the operation of the system. Furthermore, the term module as used herein is to be understood to include, but is not limited to, one or more of hardware components and/or associated software for performing a given function.

In operation, the encoder, in cooperation with the bit loading module 10, receives the input data bit stream and encodes it into M QAM constellation points. This encoding is accomplished in accordance with a bit loading table that is stored in the bit loading module 10. The bit loading table defines the number of bits carried by each tone.

The IFFT module 30 receives the encoded data and determines a sum of N carriers each modulated by a predetermined phase and amplitude. Specifically, the input to the IFFT module 30 is a vector of QAM constellation points—N complex numbers, defining the amplitude and phase of each carrier.

The cyclic prefix module 40 receives the output of the IFFT module 30 and separates the received symbols in time in order to decrease the intersymbol interference (ISI). As is well known, the signal passing through the line is linearly convolved with the impulse response of the line. If the impulse response is shorter than the duration of the cyclic prefix as discussed above, each symbol can be processed separately, thereby eliminating the intersymbol interference.

The echo canceller 50 generates a replica of the transmitted signal that leaks back into the receiver. Upon subtraction of the near-end echo-replica, the received far-end signal can be processed as if its only impairment has been the channel induced noise sources. In general, the echo cancellation in DSL systems considers the asymmetric upstream/downstream nature that results in different sampling rates for upstream and downstream communications. However, many variations and methods for reducing echo are well known to one of ordinary skill in the communications arts and will not be discussed herein.

The time domain equalizer module 80 is a filter designed to minimize the intersymbol interference and interchannel interference (ICI). This is done by reducing the total impulse response of the line to the length of the cyclic prefix, as discussed above, such that one symbol does not interfere with the next symbol and accordingly intersymbol interference can be reduced or eliminated.

The cyclic prefix module 100 complements the cyclic prefix module 40 and forwards its output to the FFT module 110. The FFT module 110 complements the operation of the IFFT module 30 by transforming the received N carriers back into amplitude and phase information, which is then decoded back into bits in cooperation with the decoder 130 and the bit loading module 140.

The training module 90 manages a number of training features that are present in the ADSL modem system 5. However, for the sake of clarity, only the training related to the application of this invention will be described. Clearly, one of ordinary skill in the art will appreciate that additional training will be present during the training and/or operating condition of a typical DSL modem.

In particular, during a portion of initial training, the DSL modem 5 enters into reverb. During this reverb training, and in conjunction with the training module 90, an estimate of the channel frequency response ($H_k$) is determined. For example, as discussed in the Sandberg article referenced above, the channel frequency response can be estimated.

Next, a reverb based TDQ training algorithm, such as the one discussed the Sandberg article referenced above, is used to determine the initial TDQ coefficients. Upon determination of these coefficients, which are stored in a memory (not shown) in the training module 90, medley is commenced. During medley, the training module 90, operating on data received from the echo canceller 50, performs one or more supplemental TDQ training sessions according to the systems and methods of this invention. Then, the updated time domain equalizer coefficients are provided from the training module 90 to the time domain equalizer 80.

Based on the determined TDQ, additional medley training is performed such as, but not limited to, FDQ training and SNR measurements for bit loading. At this point, the DSL modem 5 is ready to enter showtime.

Figure 2:
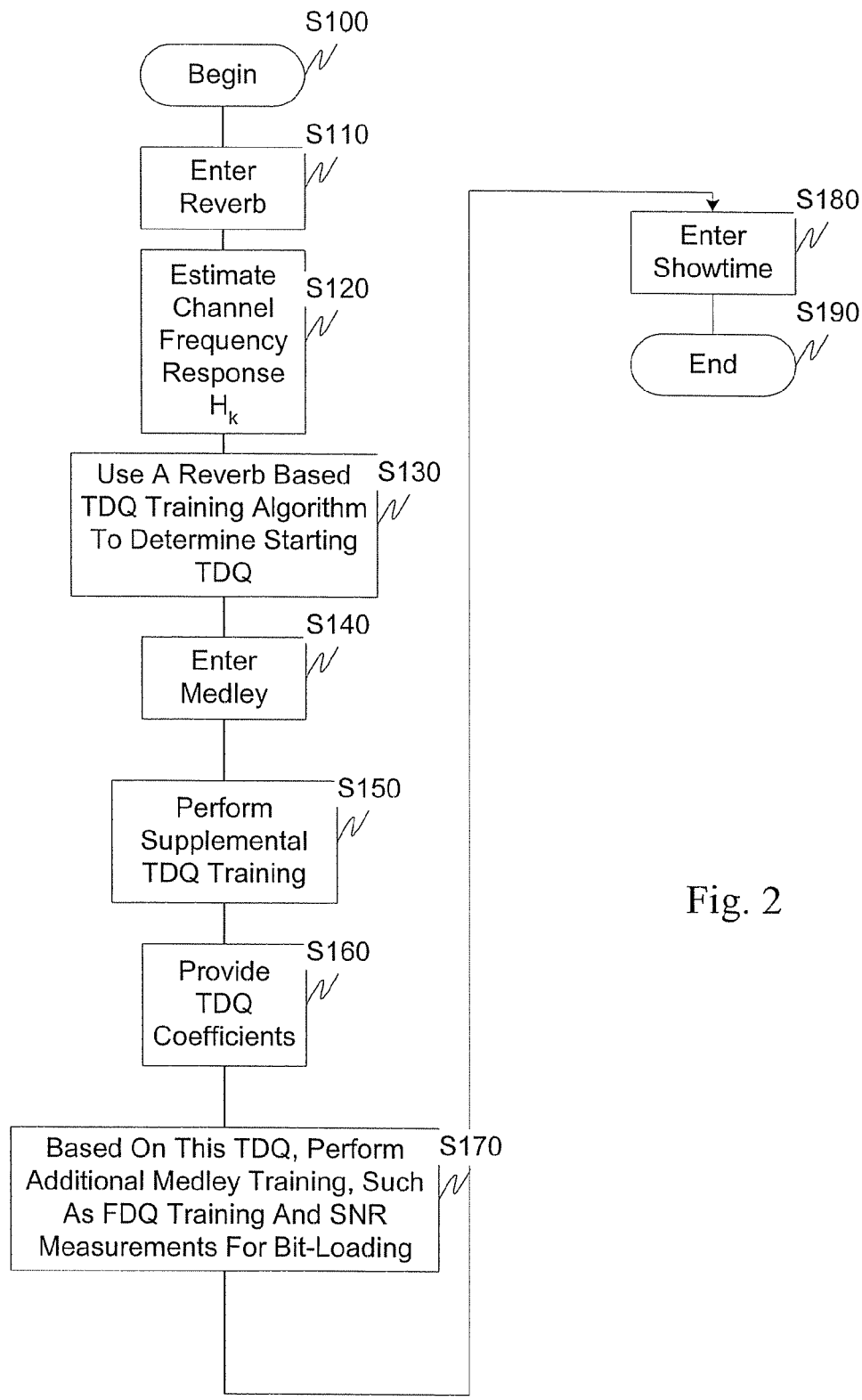
FIG. 2 illustrates how supplemental training fits into a sequence of ADSL receiver initialization/training tasks.

FIG. 2 outlines an exemplary method of performing supplemental training to determine updated time domain equalizer coefficients according to an exemplary embodiment of this invention. In particular, control begins in step S100 and continues to step S110. In step S110, reverb is commenced. Next, in step S120, the channel frequency response ($H_k$) is estimated. Then, in step S130, a reverb based TDQ training algorithm is used to determine the initial TDQ coefficients. Control then continues to step S140.

In step S140, medley is commenced. Next, in step S150, the supplemental TDQ training in accordance with this invention determines the improved time domain equalizer coefficients by maximizing the number of bits per frame. Then, in step S160, the updated time domain equalizer coefficients are provided to the time domain equalizer for use during showtime. Control then continues to step S170.

In step S170, based on the determined TDQ, additional medley training such as frequency domain equalizer training and signal-to-noise ratio measurements for the determined time domain equalizer coefficients that are used for the bit loading is completed. Then, in step S190, the modem enters the showtime. Control then continues to step S200, where the control sequence ends.

Figure 3:
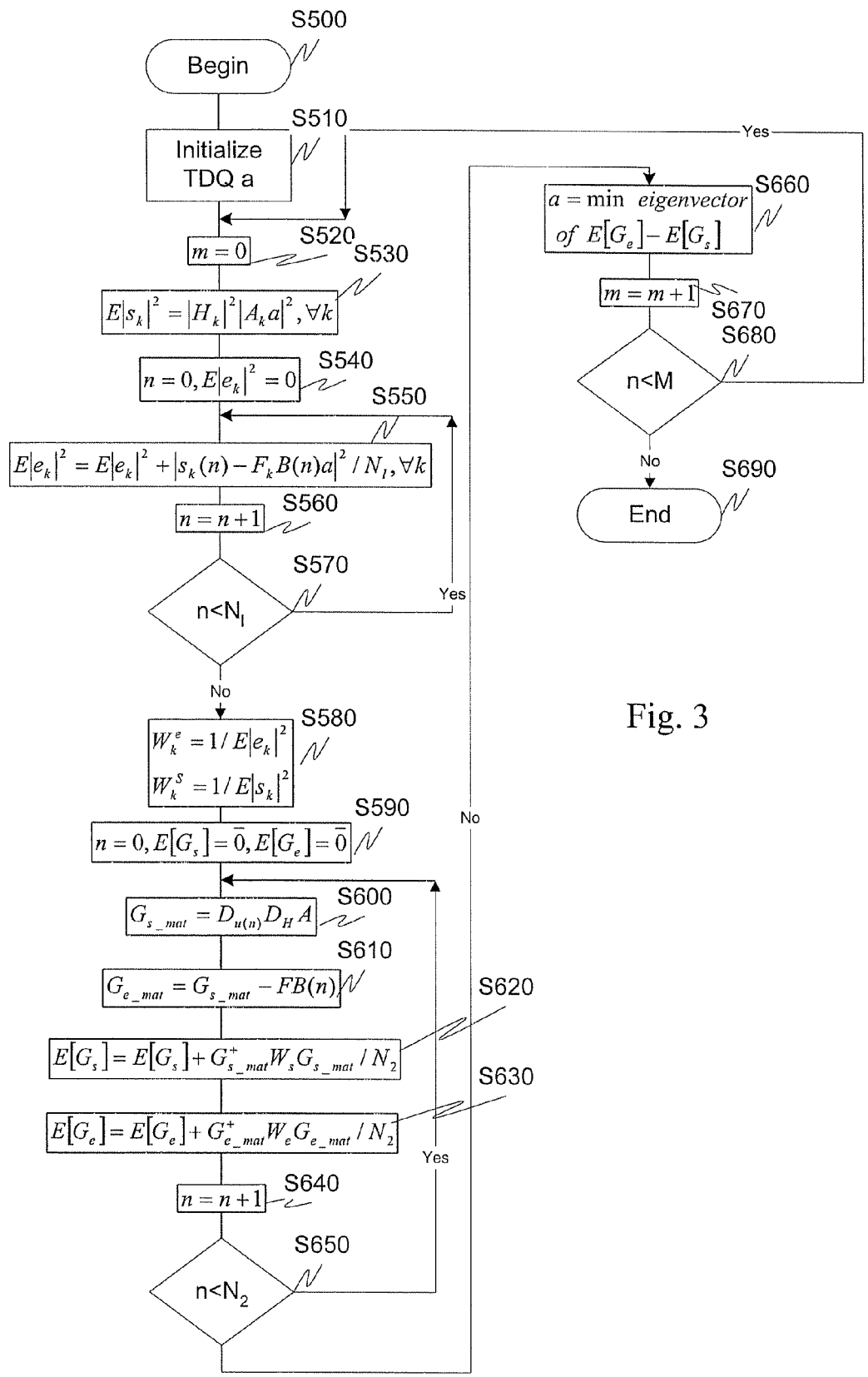
FIG. 3 is a flowchart detailing the perform supplemental training step of FIG. 2.

FIG. 3 outlines in greater detail the perform supplemental training block S150 in FIG. 2. In particular, control begins in step S500 and continues to S510. In step S510, the time domain equalizer coefficients are initialized. Next, in step S520, m is set to zero. Then, in step S530, the mean squared signal value is determined for each bin, for the given time domain equalizer coefficients. Note that the $s_k$ is equal to the medley 4-QAM reference symbol in bin k multiplied by the estimated complex channel frequency response at bin k, obtained during reverb training, multiplied by a Fourier basis row vector of length L having frequency $2\pi k/m$, multiplied by the time domain equalizer coefficients (a). Control then continues to step S540.

In step S540, n is set equal to zero and the mean square error is also set to zero. Next, in steps S550 through S570, the average error squared value is evaluated, over $N_1$ frames, for each bin. Thus, the signal $s_k$ (n) and the received data B(n) are frame dependent. Then, in step S580, $W_s$ and $W_e$ will be established as diagonal matrices with elements $W_k^s$ and $W_k^e$. This allows localization of linearized metrics about the current time domain equalizer coefficients. Control then continues to step S590.

In step S590, n is set equal to zero, and the matrices $G_e$ and $G_s$ are initialized to all-zeros matrices. Next, in steps S590 through S650, $G_s$ and $G_e$, which are functions of the reference signal $u_k(n)$ and the received data B(n) for each frame, are averaged over $N_2$ frames. Note that $a^+\{E[G_e]-E[G_s]\}a$ is a linearized/localized approximation for $$\Sigma \log_{10}(1/SNR_k)$$

which is the metric to be minimized. Then, for the next TDQ vector, the minimum Eigen vector solution is determined and the process is repeated using the updated determined localization. Control then continues to step S690 where the control sequence ends.

As illustrated in FIG. 1, the time domain equalizer coefficient determination system can be implemented either on a single program general purpose computer, or a separate program general purpose computer. However, the time domain equalizer coefficient determination system can also be implemented on a special purpose computer, a programmed microprocessor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, a modem, or the like. In general, any device capable of implementing a finite state machine that is in turn capable of implementing the flowcharts can be used to implement the time domain equalizer coefficient determination system according to this invention.

Furthermore, the disclosed method may be readily implemented in software using object or object-oriented software development environments that provide source code that can be used on a variety of computer or workstation hardware platforms. Alternatively, the disclosed line time domain equalizer coefficient determination system may be implemented partially or fully in hardware using standard logic circuits or VLSI design. Whether software or hardware is used to implement the systems in accordance with this invention is dependent on the speed and/or efficiency requirements of the system, the particular function, and the particular software and/or hardware systems or microprocessor or microcomputer systems being utilized. The time domain equalizer coefficient determination system and methods illustrated herein, however, can be readily implemented in hardware and/or software using any known or later-developed systems or structures, devices and/or software by those of ordinary skill in the applicable art from the functional description provided herein and a general basic knowledge of the computer and communications arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated line characterization system, a modem, a dedicated time domain equalizer coefficient determination system, or the like. The time domain equalizer coefficient determination system can also be implemented by physically incorporating the system and method into a software and/or hardware system, such as the hardware and software systems of a time domain equalizer coefficient determination system or modem, such as a DSL modem.

It is, therefore, apparent that there has been provided, in accordance with the present invention, systems and methods for determining time domain equalizer coefficients. While this invention has been described in conjunction with a number of exemplary embodiments, it is evident that many alternatives, modifications and variations would be or are apparent to those of ordinary skill in the applicable arts. Accordingly, the invention is intended to embrace all such alternatives, modifications, equivalents and variations that are within the spirit and scope of this invention.

What is claimed is:

1. A system capable of performing supplemental frequency domain training of a time domain equalizer in a discrete multi-tone modulation (DMT) system comprising:
    a transceiver, the transceiver:
        entering REVERB,
        estimating a channel frequency response,
        using a reverb based TDQ (Time Domain Equalizer) training technique to determine a starting TDQ, wherein a number of bits loaded per frame is maximized over a TDQ choice,
        performing supplemental training, and
        performing additional medley training prior to entering Showtime, wherein a directed search method on a capacity function is used to obtain an improved TDQ.

2. The system of claim 1, wherein the transceiver includes an ASIC.

3. The system of claim 1, wherein the transceiver includes a digital signal processor.

4. The system of claim 1, wherein the transceiver includes a processor.

* * * * *